(12) United States Patent
Suzuki et al.

(10) Patent No.: US 11,326,984 B2
(45) Date of Patent: May 10, 2022

(54) SENSOR AND SENSOR FIXING STRUCTURE (71) Applicant: SUMITOMO HEAVY INDUSTRIES, LTD., Tokyo (JP)

(72) Inventors: Kota Suzuki, Aichi (JP); Mikio Komatsu, Aichi (JP); Sotaro Tsukamoto, Aichi (JP); Hiroyuki Murai, Aichi (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 234 days.

(21) Appl. No.: 16/812,996

(22) Filed: Mar. 9, 2020

(65) Prior Publication Data
US 2020/0300729 A1   Sep. 24, 2020

(30) Foreign Application Priority Data

Mar. 19, 2019   (JP) .............................. JP2019-050710

(51) Int. Cl.
G01M 13/021   (2019.01)
G01H 17/00   (2006.01)
G01M 13/045   (2019.01)

(52) U.S. Cl.
CPC .......... *G01M 13/021* (2013.01); *G01H 17/00* (2013.01); *G01M 13/045* (2013.01)

(58) Field of Classification Search
None
See application file for complete search history.

(56) References Cited

U.S. PATENT DOCUMENTS

| 5,006,797 | A  | * | 4/1991  | Smith   | G01P 1/00 |
|           |    |   |         |         | 324/173   |
| 8,833,160 | B2 | * | 9/2014  | Hoenicka | G01D 5/00 |
|           |    |   |         |         | 73/431    |
| 9,064,486 | B2 |   | 6/2015  | Sato    |           |
| 2011/0290584 | A1 | * | 12/2011 | Sato    | B06B 1/0644 |
|           |    |   |         |         | 181/211   |
| 2013/0139589 | A1 |   | 6/2013  | Hoenicka et al. |  |
| 2013/0255387 | A1 | * | 10/2013 | Hanaoka | G01C 19/5628 |
|           |    |   |         |         | 73/649    |
| 2018/0335510 | A1 | * | 11/2018 | Kim     | G01H 17/00 |

FOREIGN PATENT DOCUMENTS

| DE | 10-2011-076395 A1 | 12/2011 |
| EP | 3364158 A1 | 8/2018 |
| JP | 2017-142160 A | 8/2017 |

OTHER PUBLICATIONS

Office Action issued in German Application No. 10 2020 106 774.7, dated Jun. 7, 2021.

* cited by examiner

*Primary Examiner* — Raul J Rios Russo
*Assistant Examiner* — Carl F. R. Tchatchouang
(74) *Attorney, Agent, or Firm* — Michael Best & Friedrich LLP (57) ABSTRACT

There is provided a sensor including a sensor element, a substrate on which the sensor element is disposed, and a casing that accommodates the substrate. The casing has a doughnut shape, and has a connecting portion for externally connecting a wire. In a doughnut-shaped internal space of the casing, the substrate is disposed, and the wire is disposed in the connecting portion from a side of the substrate far from the connecting portion. A central cylinder portion is interposed between the substrate and the wire.

20 Claims, 6 Drawing Sheets

SENSOR AND SENSOR FIXING STRUCTURE

RELATED APPLICATIONS

The content of Japanese Patent Application No. 2019-050710, on the basis of which priority benefits are claimed in an accompanying application data sheet, is in its entirety incorporated herein by reference.

BACKGROUND

Technical Field

Certain embodiments relate to a sensor and a sensor fixing structure.

Description of Related Art

A sensor is known which is attached to a diagnosis target device to acquire information relating to the device. The present applicant has disclosed a failure diagnosis device for a gear motor in the related art. The failure diagnosis device includes a vibration sensor unit installed in the gearmotor, and a diagnosis unit that determines whether or not there is an abnormality in the gear motor, based on vibrations detected by the vibration sensor unit. In the device, a protrusion portion of a leg portion supporting a substrate is fixed to the gear motor in a state of being in contact with each other.

SUMMARY

According to an embodiment of the present invention, there is provided a sensor including a sensor element, a substrate on which the sensor element is disposed, and a casing for accommodating the substrate. The casing has a connecting portion having a doughnut shape and externally connecting a wire. In a doughnut-shaped internal space of the casing, the substrate is disposed, and the wire is disposed in the connecting portion from a side of the substrate far from the connecting portion. A central cylinder portion is interposed between the substrate and the wire.

DETAILED DESCRIPTION

In a case where a sensor is attached to a diagnosis target device to acquire various kinds of information relating to the device, it is important that the sensor is compact and easily attachable. However, from this viewpoint, the sensor in the related art does not sufficiently satisfy the requirement.

It is desirable to provide a sensor which is compact and easily attachable.

Any desired combination of the above-described components and those obtained by replacing the components or expressions of the present invention with each other between methods and systems are also effective as an aspect of the present invention.

According to the present invention, it is possible to provide the sensor which is compact and easily attachable.

Hereinafter, the present invention will be described based on preferred embodiments with reference to each drawing. In the embodiments and modification examples, the same reference numerals will be assigned to the same or equivalent components or members, and description thereof will not be repeated as appropriate. Dimensions of the members in each drawing are appropriately enlarged or reduced to facilitate understanding. In each drawing, some of the members that are not important for describing the embodiments are omitted in the illustration.

Terms including ordinal numbers such as first and second are used to describe various components. However, the terms are used only for the purpose of distinguishing one component from other components. The components are not limited by the terms.

EMBODIMENT

Hereinafter, a configuration of a sensor 100 according to an embodiment of the present invention will be described with reference to the drawings. The sensor according to the present invention is not particularly limited as long as the sensor is attached to a diagnosis target device to be capable of acquiring various kinds of information relating to the device. Hereinafter, as an example, the sensor 100 according to the present embodiment will be described as an example of the sensor that detects and outputs vibrations of diagnosis target equipment.

Figure 1:
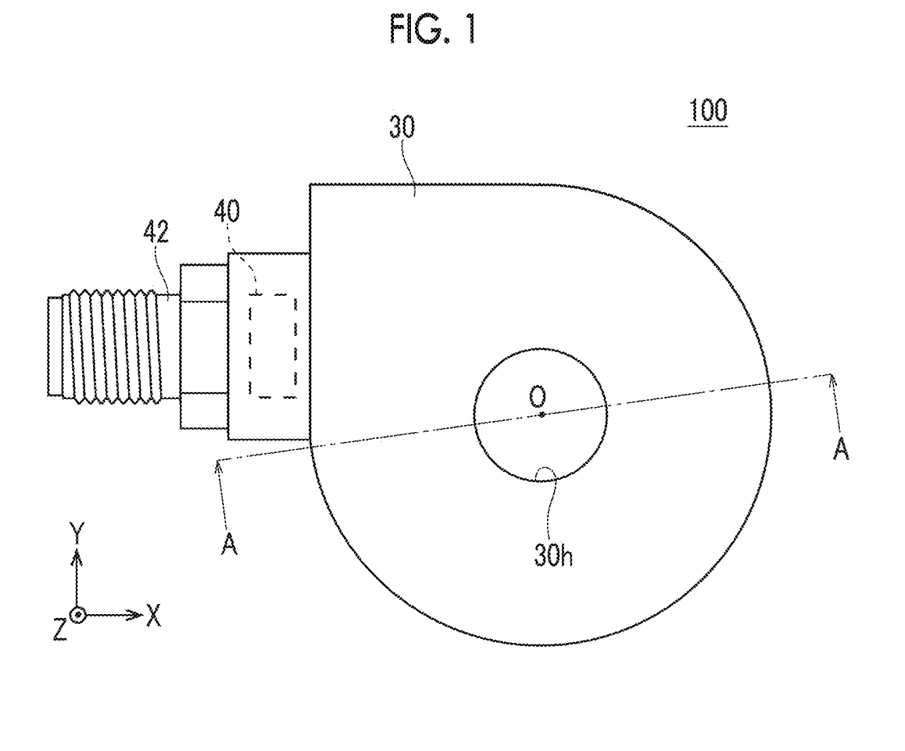
FIG. 1 is a plan view illustrating an external configuration of a sensor according to an embodiment.
Figure 2:
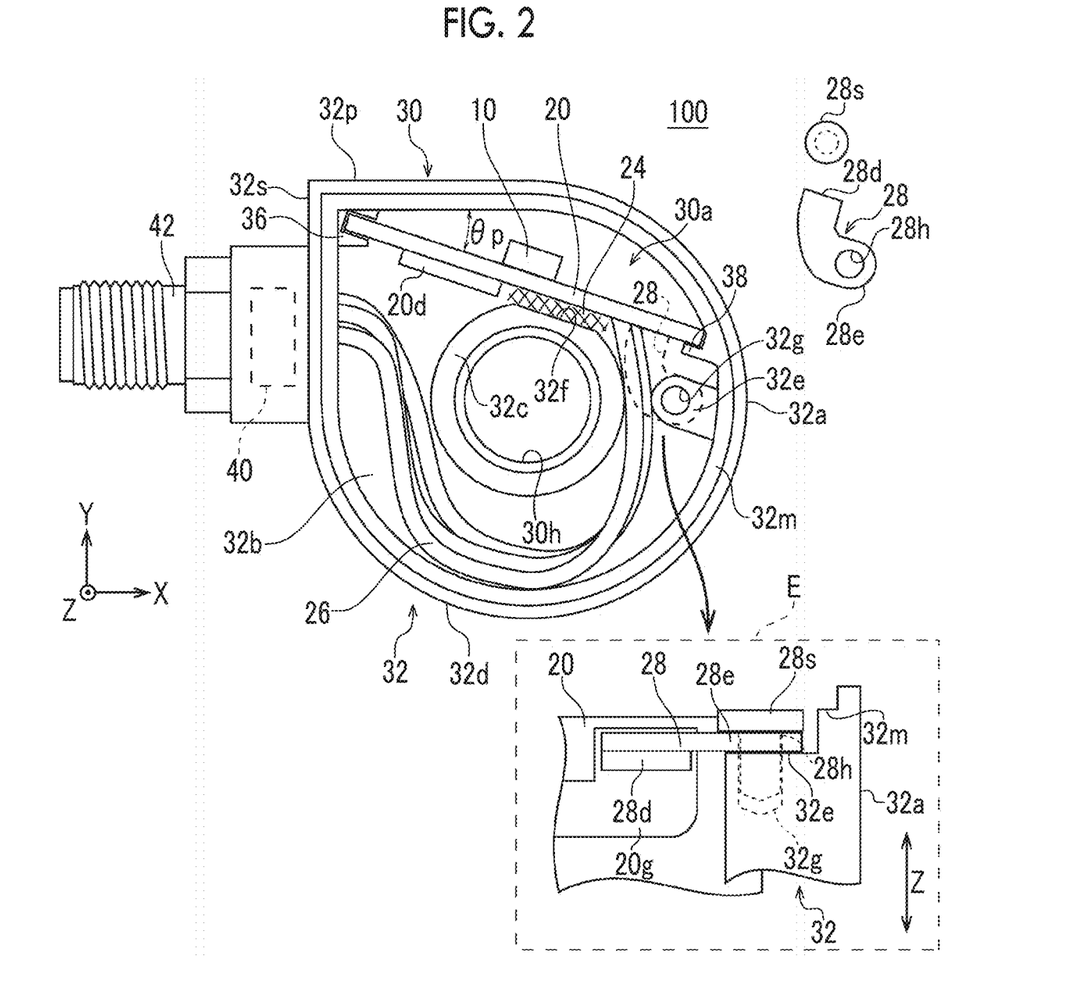
FIG. 2 is a plan view illustrating a state where a lid of the sensor in FIG. 1 is removed.
Figure 3:
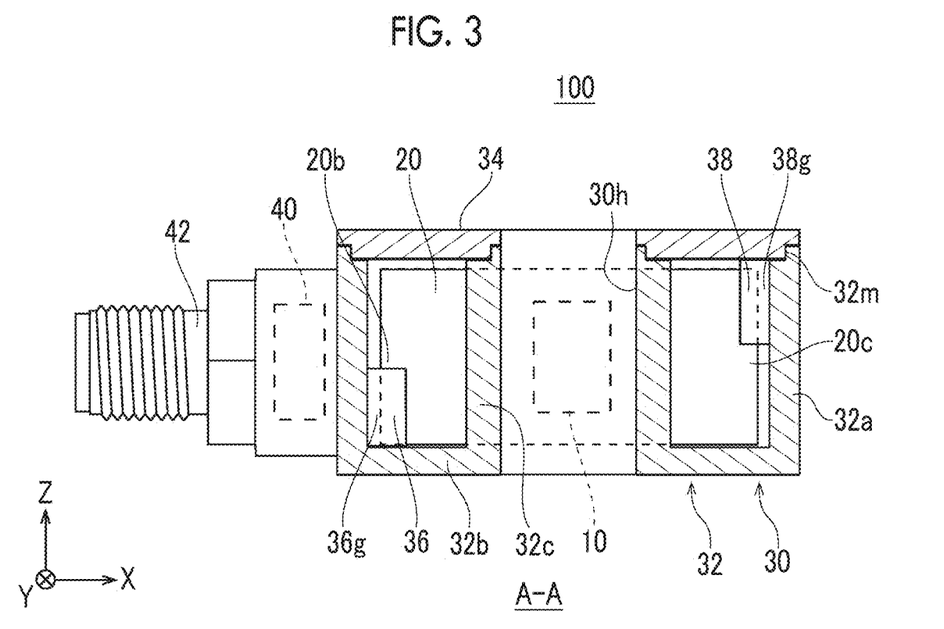
FIG. 3 is a side sectional view illustrating the sensor in FIG. 1.
Figure 4:
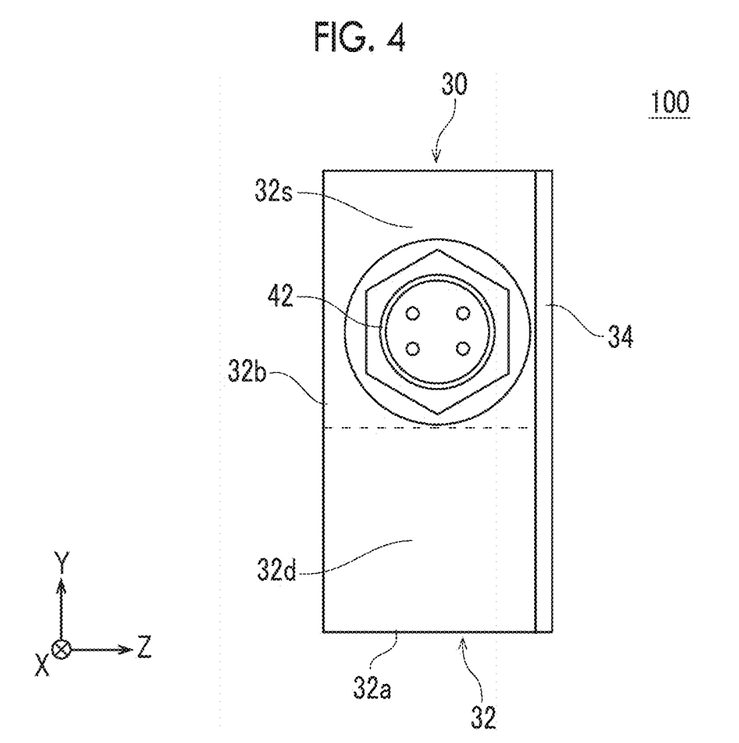
FIG. 4 is a front view illustrating the sensor in FIG. 1.

FIG. 1 is a plan view illustrating an external configuration of the sensor 100. FIG. 2 is a plan view illustrating a state where a lid 34 of the sensor 100 is removed. FIG. 3 is a side sectional view illustrating the sensor 100. This drawing illustrates a cross section taken along line A-A in FIG. 1. FIG. 4 is a front view illustrating the sensor 100. For convenience of description, as illustrated in the drawings, an XYZ rectangular coordinate system is defined in which a certain horizontal direction is an X-axis direction, a horizontal direction perpendicular to the X-axis direction is a Y-axis direction, and a vertical direction is a Z-axis direction. The Z-axis direction is perpendicular to the X-axis direction and the Y-axis direction. Each positive direction of an X-axis, a Y-axis, and a Z-axis is defined as a direction of an arrow in each drawing, and each negative direction is defined as a direction opposite to the arrow. The definition of the directions does not limit a use posture of the sensor 100, and the sensor 100 can be used in any desired posture.

The sensor 100 mainly includes a sensor element 10, a substrate 20 on which the sensor element 10 is disposed, a casing 30 that accommodates the substrate 20, a wire 26 whose one end is connected to the substrate 20, a connecting portion 40 to which the other end of the wire 26 is connected, and holding portions 36 and 38 for holding the substrate 20.

Sensor Element

The sensor element 10 detects vibrations of the diagnosis target device, and outputs a detection result as vibration information. As an example, the sensor element 10 may be a MEMS-type acceleration sensor. The MEMS-type acceleration sensor is adopted as the sensor element 10. Accordingly, the sensor 100 can have a relatively inexpensive configuration. The sensor element 10 may be capable of detecting the vibrations of one axis or a plurality of axes (for example, three axes). The sensor element 10 is mounted on the substrate 20.

Casing

Figure 5:
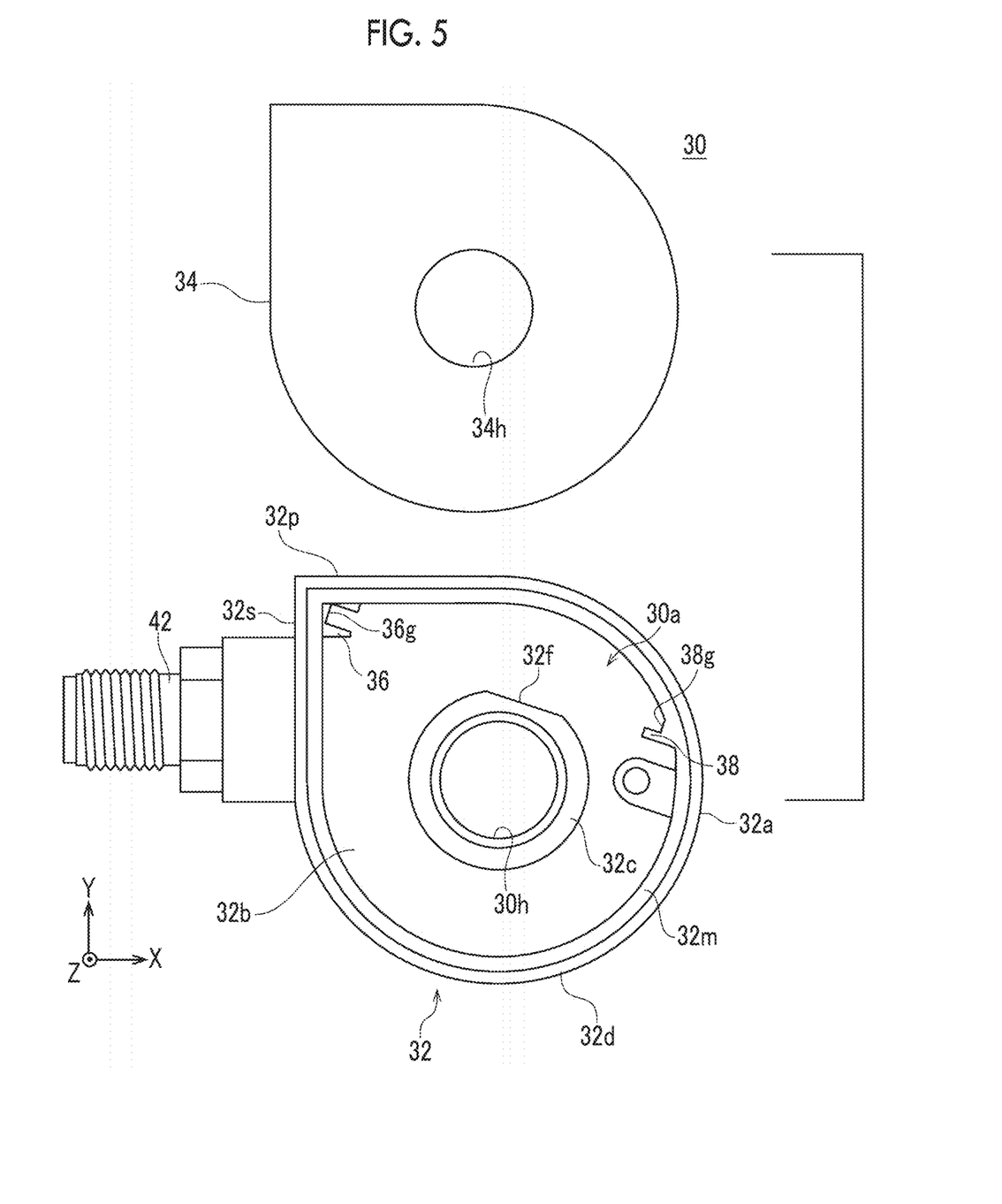
FIG. 5 is a plan view illustrating a casing of the sensor in FIG. 1.

Description will be continued with reference to FIG. 5. FIG. 5 is a plan view illustrating the casing 30. The casing 30 functions as an outer shell that accommodates the substrate 20 on which the sensor element 10 is disposed. The casing 30 has a function for transmitting the vibrations from the diagnosis target device to the sensor element 10 via the substrate 20. The casing 30 has a function for attaching the sensor 100 to the diagnosis target device. The casing 30 according to the present embodiment has a doughnut shape surrounding a through-hole 30*h* (hollow portion). Hereinafter, a circumferential direction of the through-hole 30*h* will be simply referred to as a "circumferential direction". The casing 30 is not limited to a circular or elliptical shape as long as the casing 30 is a hollow ring, and can adopt various shapes such as a triangular shape and a square shape. In an example illustrated in FIG. 5, the casing 30 has a substantially circular portion which is hollow and a rectangular portion.

The casing 30 according to the present embodiment has a main body 32 and a lid 34. The main body 32 and the lid 34 define a doughnut-shaped internal space 30*a*. The main body 32 has a peripheral wall portion 32*a*, a bottom surface 32*b*, and a central cylinder portion 32*c*. The peripheral wall portion 32*a* defines an outer peripheral surface of the internal space 30*a*. The peripheral wall portion 32*a* functions as a peripheral wall that surrounds the internal space 30*a* in the circumferential direction. The bottom surface 32*b* functions as a bottom portion that defines a lower surface of the internal space 30*a*. The bottom surface 32*b* is disposed to close a lower surface of the peripheral wall portion 32*a*.

The peripheral wall portion 32*a* has an arc portion 32*d* formed in an arc shape in a plan view, and first and second small curvature portions 32*p* and 32*s* having a shape whose curvature is smaller (curvature radius is larger) than the arc portion 32*d* in a plan view. Since the arc portion 32*d* is provided, an occupied area in a plan view can be reduced. Compared to a corner portion, the arc portion 32*d* can minimize damage in a case of colliding with other members. In the present embodiment, the arc portion 32*d* has a three-quarter arc shape in a plan view.

As illustrated in FIG. 5, the first small curvature portion 32*p* extends in a negative direction in the X-axis direction along an arc tangent line from an upper end in the drawing of the arc portion 32*d*. The second small curvature portion 32*s* extends in a positive direction in the Y-axis direction along the arc tangent line from a left end in the drawing of the arc portion 32*d*. The first small curvature portion 32*p* and the second small curvature portion 32*s* linearly extend, and are substantially perpendicular to each other on an upper left side in the drawing. An output portion 42 (to be described later) is disposed in the second small curvature portion 32*s*.

The central cylinder portion 32*c* defines an inner peripheral surface of the internal space 30*a*. The central cylinder portion 32*c* is erected on a bottom surface 32*b*, and has a hollow cylindrical shape surrounding the through-hole 30*h*. A flat surface 32*f* facing the substrate 20 is disposed on an outer periphery of the central cylinder portion 32*c*. Since the flat surface 32*f* is provided, the central cylinder portion 32*c* has an outer peripheral contour having a D-cut shape including an arc portion and a flat portion. The flat surface 32*f* faces the substrate 20 via a gap. The flat surface 32*f* functions as a transmission surface that transmits the vibrations from the diagnosis target device to the sensor element 10. The flat surface 32*f* may be disposed parallel to the substrate 20.

As illustrated in FIG. 2, a portion between the flat surface 32*f* and the substrate 20 is filled with a resin 24. The flat surface 32*f* is disposed at a position facing the sensor element 10 across the substrate 20 and the resin 24. Since the portion is filled with the resin 24, the vibrations can be efficiently transmitted from the diagnosis target device to the sensor element 10. An extending range of the flat surface 32*f* may partially or entirely overlap a portion or all of an extending range of a surface of the sensor element 10 which is parallel to the substrate 20. In this case, the vibrations can be more efficiently transmitted. As the resin 24, various resins capable of maintaining an interposed state can be adopted. As an example, the resin 24 may be an epoxy resin.

The peripheral wall portion 32*a*, the bottom surface 32*b*, and the central cylinder portion 32*c* may be separately formed and joined. However, all of these are integrally formed in the present embodiment. The lid 34 functions as a lid that defines an upper surface of the internal space 30*a*. The lid 34 is a doughnut-shaped and plate-shaped member that is thin in an upward-downward direction. The lid 34 is fitted into a circumferential step portion 32*m* disposed on an upper surface of the peripheral wall portion 32*a* so as to cover an upper surface of the peripheral wall portion 32*a*. The lid 34 may be joined to the main body 32 through bonding or welding.

The casing 30 can be formed of a metal material or a nonmetallic material. As an example, the casing 30 can be manufactured using a ferrous metal through a known method such as press working, die casting, and cutting.

Substrate

Figure 6:
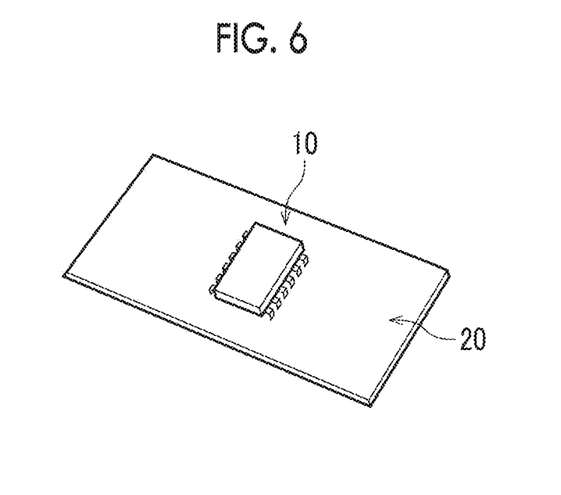
FIG. 6 is a perspective view illustrating a substrate and a sensor element of the sensor in FIG. 1.

Description will be continued with reference to FIG. 6. FIG. 6 is a perspective view illustrating the substrate 20. The substrate 20 according to the present embodiment has a substantially rectangular shape. A wire pattern (not illustrated) is formed on the substrate 20. Vibration information generated by the sensor element 10 is transmitted to the output portion 42 via the wire pattern and the wire 26 for connecting the substrate 20 and the connecting portion 40 to each other.

Although a type of the substrate 20 is not limited, the substrate 20 according to the present embodiment is a rigid substrate. In a case of a flexible substrate, a separate rigid member is required to hold the sensor element 10 at a predetermined position. However, the rigid substrate can hold the sensor element 10 without using the separate rigid member. The sensor element 10 has directivity. When rigidity of the substrate is low, a position and an angle of the sensor element 10 may vary, thereby degrading detection accuracy of the sensor element 10. However, degradation of the detection accuracy can be suppressed by using the rigid substrate.

As illustrated in FIG. 2, the substrate 20 is disposed close to the peripheral wall portion 32*a* (first small curvature portion 32*p*), in the vicinity of the output portion 42 of the casing 30. A main surface of the substrate 20 faces the peripheral wall portion 32*a*. The sensor element 10 is disposed in a space on the peripheral wall side 32*a* of the substrate 20, and the wire 26 is disposed in a space on a side opposite to the peripheral wall portion 32*a* of the substrate 20.

A longitudinal direction of the substrate 20 is inclined with respect to an extending direction (X-axis direction) of the first small curvature portion 32p. In this case, the casing 30 can be more compact under a condition that a width of the substrate 20 in the longitudinal direction is constant (that is, an area is constant), compared to a case where longitudinal direction is not inclined. Since the longitudinal direction is inclined, a space that can accommodate the sensor element 10 can be formed between the substrate 20 and the first small curvature portion 32p. An inclination angle θp of the longitudinal direction of the substrate 20 with respect to the first small curvature portion 32p may be 10° to 30°, for example.

The sensor element 10 is disposed on a surface of the substrate 20 opposite to the flat surface 32f. An electronic component 20d connected to a periphery of the sensor element 10 is disposed on a surface of the substrate 20 opposite to the sensor element 10. The electronic component 20d may be a resistor or a capacitor, for example. A portion of the electronic component 20d may be disposed on the same surface as that of the sensor element 10. Since the substrate 20 is a double-sided substrate, an area of the substrate is reduced, and a size of the sensor 100 can be reduced.

The substrate 20 is disposed in the internal space 30a of the casing 30. One end of the wire 26 is connected to the substrate 20. The other end of the wire 26 is connected to the connecting portion 40 disposed in the casing 30. The wire 26 supplies power from the connecting portion 40 to a circuit of the substrate 20 and the sensor element 10. The wire 26 outputs a signal based on a detection result of the sensor element 10 from the substrate 20 to the connecting portion 40. The connecting portion 40 externally connects the wire 26.

As illustrated in FIG. 2, the substrate 20 has an earth member 28 made of a conductive material such as a copper plate. A portion surrounded by a broken line E in FIG. 2 indicates a periphery of the earth member 28 viewed in a direction perpendicular to the main surface of the substrate 20. The earth member 28 is a member for electrically connecting a ground line 20g of the substrate 20 to an earth portion 32e of the casing 30. The earth member 28 is a plate-shaped member extending from a base end portion 28d electrically connected to the ground line 20g to a tip portion 28e electrically connected to the earth portion 32e.

A female screw hole 32g into which a screw 28s is screwed is formed in the earth portion 32e. An attachment hole 28h into which the screw 28s is inserted is formed in a tip portion 28e. As an example, a base end portion 28d is fixed to the ground line 20g of the substrate 20 through soldering, and the tip portion 28e is fixed to the earth portion 32e by screwing the screw 28s into the female screw hole 32g through the attachment hole 28h. In this way, the ground line 20g of the substrate 20 is electrically connected to the casing 30. Accordingly, the casing 30 can function as a shield case that surrounds the substrate 20 and the sensor element 10. The substrate 20 is mechanically supported by the earth portion 32e of the casing 30 via the earth member 28. In this manner, the vibrations of the substrate 20 can be suppressed.

Output Portion

The output portion 42 functions as a connector that connects the connecting portion 40 and an external device to each other. That is, the output portion 42 can output a signal based on a detection result of the sensor element 10 to the external device via the connecting portion 40. When the output portion 42 is disposed in the arc portion 32d having a relatively large curvature, a gap is likely to be formed between the output portion 42 and the arc portion 32d. Therefore, in the present embodiment, the output portion 42 is disposed in the second small curvature portion 32s having a relatively small curvature. In an example illustrated in FIG. 2, the output portion 42 is a round connector that protrudes in the negative direction in the X-axis direction from the second small curvature portion 32s.

The wire 26 includes a plurality of conductive wires coated with a resin. As illustrated in FIG. 2, the wire 26 is disposed in the connecting portion 40 from a side of the substrate 20 far from the connecting portion 40. That is, a substrate side end portion of the wire 26 is connected to the side far from the connecting portion 40. When the wire 26 is connected to a side of the substrate 20 close to the connecting portion 40, a periphery thereof is narrowed, and the wire 26 and the connecting portion 40 are less likely to be connected to each other. Accordingly, the wire 26 is connected to the side far from the connecting portion 40. In this manner, there is room in the periphery, and thus, both of these are likely to be connected to each other. A bending radius of the wire 26 increases in the vicinity of the connecting portion 40. Accordingly, stress applied to the connecting portion 40 from the wire 26 can be weakened. This configuration is advantageous in terms of reliability of the connecting portion 40.

As illustrated in FIG. 2, the wire 26 is disposed to interpose the central cylinder portion 32c between the substrate 20 and the wire 26. That is, the wire 26 is disposed to pass through a side of the central cylinder portion 32c opposite to the substrate. Compared to a case where the wire 26 is disposed between the central cylinder portion 32c and the substrate 20, the bending radius of the wire 26 increases. Therefore, the wire 26 is easily disposed, and the bending stress applied to the wire 26 can be reduced. This configuration is advantageous in terms of reliability of the wire 26.

When a position of the substrate 20 varies inside the casing 30, a way varies in transmitting the vibrations transmitted from the diagnosis target device via the casing 30 to the sensor element 10. That is, detection sensitivity of the sensor element 10 varies due to variations in the position of the substrate 20. Therefore, the present embodiment is provided with holding portions 36 and 38 for holding the substrate 20. The holding portions 36 and 38 may be formed integrally with the casing 30.

As illustrated in FIGS. 2, 3, and 5, the holding portions 36 and 38 include a first holding portion 36 that holds one end side 20b of the substrate 20 and a second holding portion 38 that holds the other end side 20c of the substrate 20. The first holding portion 36 and the second holding portion 38 are disposed on one side (left side in the drawing) and the other side (right side in the drawing) of the flat surface 32f. In this case, both ends of the substrate 20 can be held. Accordingly, the variation in the position of the substrate 20 can be reduced. The first holding portion 36 has a first groove 36g disposed on a side of the substrate 20 close to the connecting portion 40, on an inner peripheral surface of the peripheral wall portion 32a. The second holding portion 38 has a second groove 38g disposed on a side of the substrate 20 far from the connecting portion 40, on the inner peripheral surface of the peripheral wall portion 32a.

The first groove 36g and the second groove 38g have a groove width obtained by adding a margin to the thickness of the substrate 20, and extend in the upward-downward direction. One of the first groove 36g and the second groove 38g may be disposed in the vicinity of an upper end of the peripheral wall portion 32a, and the other may be disposed on the bottom surface 32b. In the present embodiment, the first groove 36g is disposed on the bottom surface 32b, and the second groove 38g is disposed in the vicinity of the upper end of the peripheral wall portion 32a. In an example illustrated in FIG. 3, vertical ranges of the first groove 36g (first holding portion 36) and the second groove 38g (second holding portion 38) do not overlap each other. In other words, the first holding portion 36 and the second holding portion 38 do not overlap each other when viewed in a direction perpendicular to the peripheral wall portion 32a.

When the substrate 20 is inserted, the other end side 20c of the substrate 20 may be first inserted only into the second groove 38g in the vicinity of the upper end. When the substrate 20 is inserted to some extent, when the substrate 20 is continuously inserted with the second groove 38g serving as a guide, the one end side 20b of the substrate 20 is easily inserted into the first groove 36g.

A brief configuration according to an aspect of the present invention is as follows. The sensor 100 according to the aspect of the present invention includes the sensor element 10, the substrate 20 on which the sensor element 10 is disposed, and the casing 30 that accommodates the substrate 20. The casing 30 has a doughnut shape, and has the connecting portion 40 for externally connecting the wire 26. The substrate 20 is disposed in the doughnut-shaped internal space 30a of the casing 30. The wire 26 is disposed in connecting portion 40 from the side of the substrate 20 far from the connecting portion 40. The central cylinder portion 32c is interposed between the substrate 20 and the wire 26.

According to this aspect, since the casing 30 is formed in the doughnut shape, the casing can be easily more compact. The sensor 100 can be easily attached to the diagnosis target device by screwing a fixture such as a bolt into the diagnosis target device through a doughnut-shaped hollow portion.

The substrate 20 may be a rigid substrate. In this case, the substrate can be configured to inexpensively include various types, and accuracy in holding a position for the sensor element 10 can be improved.

The holding portions 36 and 38 for holding the substrate 20 may be provided. In this case, variations in the position of the substrate 20 can be reduced compared to a case where the holding portion is not provided. Accordingly, accuracy in holding the position for the sensor element 10 can be improved.

The holding portions 36 and 38 may include a groove 38g disposed on a side surface of the casing 30. In this case, the substrate 20 can be easily mounted by slidably inserting the substrate 20 into the groove 38g.

The holding portions 36 and 38 include a first holding portion 36 on one end side 20b of the substrate 20 and a second holding portion 38 on the other end side 20c. The second holding portion 38 may be disposed on a side surface of the casing 30, and the first holding portion 36 may be disposed on the bottom surface 32b of the casing 30. In this case, only the other end side 20c of the substrate 20 may be inserted into the second holding portion 38 at an initial insertion stage of the substrate 20. After the other end side 20c is inserted to some extent, the one end side 20b of the substrate 20 can be easily inserted into the first holding portion 36 by using the second holding portion 38 as a guide. As a result, the substrate 20 can be easily mounted on the holding portions 36 and 38.

The central cylinder portion 32c may have the flat surface 32f facing the substrate 20. In this case, detection target vibrations can be more efficiently transmitted from the flat surface 32f to the sensor element 10 on the substrate 20, compared to a case where the flat surface 32f is not provided. Variations in transmitting the vibrations can be reduced.

The first holding portion 36 and the second holding portion 38 may be disposed on one side and the other side of the flat surface 32f. In this case, a positional relationship between the flat surface 32f and the substrate 20 can be further stabilized, compared to a case where the substrate 20 is supported on one side. Variation in transmitting the detection target vibrations from the flat surface 32f to the sensor element 10 on the substrate 20 can be reduced.

A portion between the substrate 20 and the flat surface 32f may be filled with the resin 24. In this case, the detection target vibrations can be efficiently transmitted from the flat surface 32f to the sensor element 10 on the substrate 20, and the variations in transmitting the vibrations can be reduced.

An outer shape of the casing 30 may have the arc portion 32d, and the first and second small curvature portions 32p and 32s whose curvature is smaller than that of the arc portion 32d. The second small curvature portion 32s may have the output portion 42 for connecting the connecting portion 40 and an external device to each other. In this case, a gap between the output portion 42 and the casing 30 can be reduced, compared to a case where the output portion 42 is disposed in the arc portion 32d. Hitherto, the embodiment has been described.

An example of an operation of the sensor 100 configured as described above will be described. The sensor 100 is operated in a state where the bottom surface 32b is in contact with a diagnosis target device (not illustrated). The sensor 100 is attached to the diagnosis target device by a connecting member (not illustrated) such as a bolt that is screwed to diagnosis target equipment after penetrating the through-hole 30h. The sensor 100 transmits the vibrations generated in the diagnosis target device to the sensor element 10 via the bottom surface 32b and the central cylinder portion 32c. The sensor element 10 detects the vibrations, and generates vibration information indicating a magnitude of the vibrations. The sensor 100 outputs the vibration information to an external device (not illustrated) via the connecting portion 40 and the output portion 42. Hitherto, the embodiment has been described.

Another Embodiment

Figure 7:
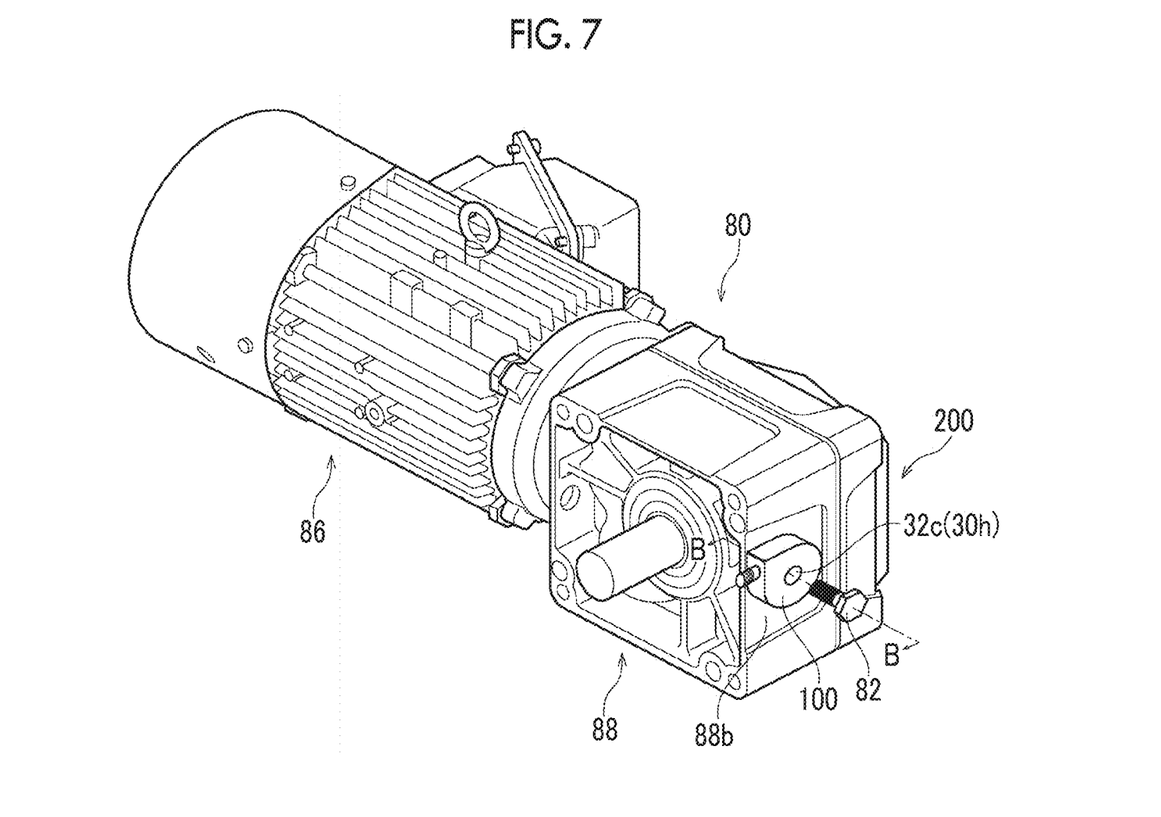
FIG. 7 is a perspective view illustrating a sensor fixing structure according to another embodiment.
Figure 8:
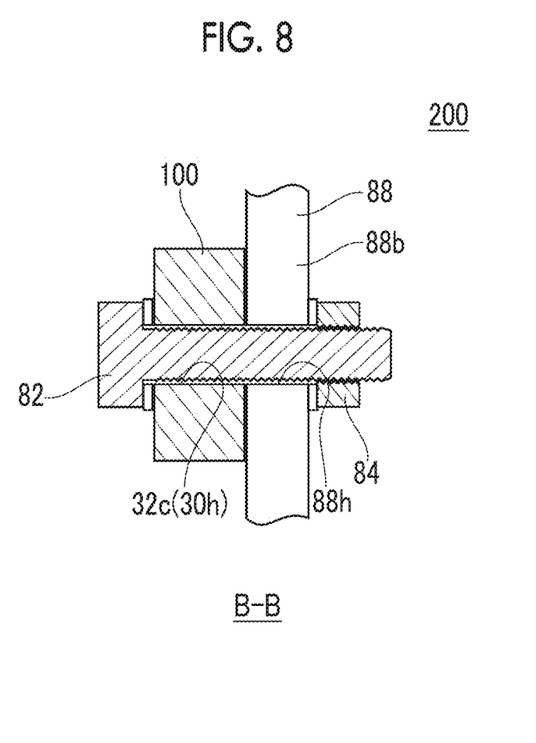
FIG. 8 is a sectional view illustrating a periphery of the sensor fixing structure in FIG. 7.

A sensor fixing structure 200 according to another embodiment of the present invention will be described with reference to FIGS. 7 and 8. FIG. 7 is a perspective view illustrating a periphery of the sensor fixing structure 200. This drawing illustrates a diagnosis target device 80, the sensor 100, and a connecting member 82. A cable for connecting the sensor 100 and the external device to each other is omitted in the illustration. FIG. 8 is a sectional view of the sensor fixing structure 200 which is taken along line B-B.

The sensor fixing structure 200 fixes the sensor 100 to the diagnosis target device 80. The sensor fixing structure 200 fixes the sensor 100 to the diagnosis target device 80 by inserting the connecting member 82 into the through-hole 30h of the central cylinder portion 32c and fixing the connecting member 82 to the diagnosis target device 80.

The diagnosis target device 80 according to the present embodiment is a gear motor including a motor 86 and a speed reducer 88. In an example illustrated in FIG. 7, the motor 86 is an electric motor, and the speed reducer 88 is a perpendicular type speed reducer in which an input shaft is substantially perpendicular to an output shaft. The sensor 100 may be attached to the speed reducer 88 or the motor 86. The diagnosis target device is not limited to a gear motor, and is applicable to various devices. For example, the diagnosis target device is applicable to various devices such as robots, machine tools, injection molding machines, and vehicles.

As an attachment position of the sensor 100 in the diagnosis target device 80, a position suitable for abnormality detection may be determined by experiments or simulations. In an example illustrated in FIG. 7, the sensor 100 is fixed to a side wall portion 88b on a side of the speed reducer 88 opposite to the motor 86. In an example illustrated in FIG. 8, the connecting member 82 is a bolt that penetrates the through-hole 30h of the sensor 100 and a through-hole 88h of the side wall portion 88b. A nut 84 is screwed into a tip end side of the connecting member 82. In order to stabilize a contact state, a washer may be interposed between the sensor 100 and the side wall portion 88b.

The sensor 100 detects the vibrations generated in the diagnosis target device 80, generates the vibration information indicating a magnitude of the vibrations, and outputs the vibration information to an external device (not illustrated). As an example, the external device may be a diagnosis unit that determines whether or not there is an abnormality in the diagnosis target device 80, based on the vibration information transmitted from the sensor 100.

FIG. 7 illustrates a case where one sensor 100 is attached to the diagnosis target device 80. However, two or more sensors 100 may be attached to the diagnosis target device 80.

Hitherto, examples of the embodiments according to the present invention have been described in detail. The embodiments described above are merely specific examples for implementing the present invention. The content of the embodiments does not limit the technical scope of the present invention. Many design changes such as component changes, additions, and deletions can be made within the scope not departing from the concept of the invention specified in the appended claims. In the above-described embodiments, the content that enables the design change has been described with definitions such as "of the embodiment" and "in the embodiment". However, as a matter of course, the design change is also allowable for the content which does not have the definition. A hated cross section in the drawing does not limit a material of a hatched target.

Hereinafter, modification examples will be described. In the drawings and description of the modification examples, the same reference numerals will be assigned to components and members which are the same as or equivalent to those according to the embodiments. The repeated description of the embodiments will be omitted as appropriate, and configurations different from those according to the embodiments will be mainly described.

MODIFICATION EXAMPLES

In the description of the embodiment, an example has been described in which the sensor 100 acquires the vibrations of the diagnosis target device. However, the present invention is not limited thereto, and the sensor 100 may acquire various kinds of information relating to the diagnosis target device. For example, the sensor 100 may be capable of acquiring electromagnetic information such as currents or physical information such as temperatures.

In the description of the embodiment, an example has been described in which the resin 24 interposed between the flat surface 32f and the substrate 20 is an epoxy resin. However, the present invention is not limited thereto, and various types of resins may be adopted as the resin 24. For example, the resin 24 may be a thermosetting resin, a thermoplastic resin, or a cold-setting resin.

In the description of the embodiment, the example in which the resin 24 is interposed between the flat surface 32f and the substrate 20 has been described. However, the present invention is not limited to this, and other locations inside the casing 30 may be coated with the resin 24. For example, the whole casing 30 may be internally filled with the resin 24.

In the description of the embodiment, an example has been described in which the vertical ranges of the first groove 36g and the second groove 38g do not overlap each other. However, the vertical ranges may overlap each other.

In the description of the embodiment, an example has been described in which the sensor element 10 is mounted on the surface of the substrate 20 opposite to the central cylinder portion 30c. However, the sensor element 10 may be mounted on a surface of the substrate 20 on the central cylinder portion 30c side. The sensor element 10 may be mounted on a region of the substrate 20 facing the central cylinder portion 30c.

In the description of the embodiment, an example has been described in which the output portion 42 is a connector. However, the present invention is not limited thereto. For example, the output portion 42 may be a wire harness for connecting the connecting portion 40 and an external device to each other.

In the description of another embodiment, an example has been described in which the connecting member 82 is screwed into the nut 84. However, the present invention is not limited thereto, and the connecting member 82 may be fixed to the diagnosis target device 80 by using various means. For example, the connecting member 82 may be screwed and fixed into a tap hole formed in the side wall portion 88b. The connecting member 82 is not limited to a bolt, and may be any member that can fix the sensor 100 to the diagnosis target device. For example, a press-fit pin or a rivet may be used.

The respective modification examples described above can achieve operational effect the same as those according to the above-described embodiments.

Any desired combination of the above-described embodiments and modification examples is useful as an embodiment according to the present invention. New embodiments acquired by the combination have advantageous effects of the respectively combined embodiments and modification examples.

It should be understood that the invention is not limited to the above-described embodiment, but may be modified into various forms on the basis of the spirit of the invention. Additionally, the modifications are included in the scope of the invention.

What is claimed is:
1. A sensor comprising:
a sensor element;
a substrate on which the sensor element is disposed; and
a casing that accommodates the substrate,
wherein the casing comprises:
   a doughnut shape having a central cylinder portion, the central cylinder portion having a hollow cylindrical shape surrounding a through-hole, and
   a connecting portion for externally connecting a wire,
wherein in a doughnut-shaped internal space of the casing:
   the substrate is disposed, and the wire is disposed in the connecting portion from a side of the substrate far from the connecting portion, and wherein the central cylinder portion is interposed between the substrate and the wire.

2. The sensor according to claim 1,
wherein the substrate is a rigid substrate.

3. The sensor according to claim 1,
wherein the substrate is a double-sided substrate having the sensor element disposed on one surface thereof and an electronic component disposed on a surface opposite to the one surface.

4. The sensor according to claim 1,
wherein the substrate is electrically and/or mechanically connected to the casing via an earth member disposed in the substrate.

5. The sensor according to claim 4,
wherein the earth member is a plate-shaped member extending from a base end portion connected to a ground line of the substrate to a tip portion connected to an earth portion of the casing.

6. The sensor according to claim 1, further comprising:
a holding portion configured to hold the substrate.

7. The sensor according to claim 6,
wherein the holding portion comprises a groove disposed on a side surface of the casing.

8. The sensor according to claim 6,
wherein the holding portion comprises a first holding portion on one end side of the substrate and a second holding portion on the other end side,
the first holding portion comprises a first groove disposed on a side of the substrate close to the connecting portion on a side surface of the casing, and
the second holding portion comprises a second groove disposed on a side of the substrate far from the connecting portion on the side surface of the casing.

9. The sensor according to claim 8,
wherein vertical ranges of the first groove and the second groove do not overlap each other.

10. The sensor according to claim 6,
wherein:
the holding portion comprises a first holding portion on one end side of the substrate and a second holding portion on the other end side,
the first holding portion is disposed on a side surface of the casing, and
the second holding portion is disposed on a bottom surface of the casing.

11. The sensor according to claim 1,
wherein a flat surface facing the substrate is disposed in the central cylinder portion.

12. The sensor according to claim 11,
wherein an extending range of the flat surface partially or entirely overlaps an extending range of a surface of the sensor element which is parallel to the substrate.

13. The sensor according to claim 10,
wherein a flat surface facing the substrate is disposed in the central cylinder portion, and
wherein the first holding portion and the second holding portion are disposed on one side and the other side of the flat surface.

14. The sensor according to claim 1,
wherein a flat surface facing the substrate is disposed in the central cylinder portion, and
wherein a portion between the substrate and the flat surface is filled with a resin.

15. A sensor comprising:
a sensor element;
a substrate on which the sensor element is disposed; and
a casing that accommodates the substrate,
wherein the casing comprises:
    a doughnut shape having a central cylinder portion, the central cylinder portion having a hollow cylindrical shape surrounding a through-hole, and
    a connecting portion for externally connecting a wire,
wherein in a doughnut-shaped internal space of the casing:
    the substrate is disposed, and
    the wire is disposed in the connecting portion from a side of the substrate far from the connecting portion,
wherein the central cylinder portion is interposed between the substrate and the wire,
wherein an outer shape of the casing comprises:
    an arc portion and
    a small curvature portion having a smaller curvature than the arc portion, and
wherein an output portion for connecting the connecting portion and an external device is disposed in the small curvature portion.

16. The sensor according to claim 15,
wherein the arc portion has a three-quarter arc shape.

17. The sensor according to claim 15,
wherein:
    the small curvature portion comprises a first small curvature portion and a second small curvature portion,
    the first small curvature portion extends from one end of the arc portion along an arc tangent line,
    the second small curvature portion extends from the other end of the arc portion along the arc tangent line, and
    the first small curvature portion and the second small curvature portion linearly extend and are substantially perpendicular to each other.

18. The sensor according to claim 17,
wherein a longitudinal direction of the substrate is inclined with respect to an extending direction of the first small curvature portion.

19. The sensor according to claim 18,
wherein an inclination angle of the longitudinal direction of the substrate with respect to the extending direction of the first small curvature portion is 10° to 30°.

20. A sensor fixing structure for fixing the sensor according to claim 1 to a diagnosis target device,
wherein the sensor is fixed to the diagnosis target device by inserting a connecting member into the central cylinder portion and fixing the connecting member to the diagnosis target device.

* * * * *